(12) United States Patent
Morris

(10) Patent No.: US 8,782,555 B2
(45) Date of Patent: Jul. 15, 2014

(54) NESTED USER INTERFACES FOR MULTIPLE DISPLAYS

(75) Inventor: Ronald A. Morris, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1279 days.

(21) Appl. No.: 11/897,803

(22) Filed: Aug. 30, 2007

(65) Prior Publication Data

US 2009/0064020 A1 Mar. 5, 2009

(51) Int. Cl.
| G06F 12/02 | (2006.01) |
| G06F 3/048 | (2013.01) |
| G06F 15/16 | (2006.01) |
| G06F 3/00 | (2006.01) |
| G06F 17/00 | (2006.01) |
| G06F 3/0481 | (2013.01) |
| G06F 3/0482 | (2013.01) |
| G09G 5/14 | (2006.01) |
| G06F 17/30 | (2006.01) |

(52) U.S. Cl.
CPC ............ *G06F 3/0481* (2013.01); *G06F 3/0482* (2013.01); *G06F 17/30905* (2013.01); *G09G 5/14* (2013.01); *G09G 2370/027* (2013.01)
USPC ............................. 715/810; 715/793; 715/765

(58) Field of Classification Search
CPC ................ G06F 3/0481; G06F 3/0482; G06F 17/30905; G09G 5/14; G09G 2370/027
USPC ......................................... 715/810, 793, 765
See application file for complete search history.

(56) References Cited

U.S. PATENT DOCUMENTS

| 5,182,796 A | 1/1993 | Shibayama et al. |
| 5,425,140 A | 6/1995 | Bloomfield et al. |
| 5,533,183 A | 7/1996 | Henderson, Jr. et al. |
| 5,712,995 A * | 1/1998 | Cohn ............................ 715/792 |
| 5,956,035 A | 9/1999 | Sciammarella et al. |
| 6,011,546 A * | 1/2000 | Bertram ........................ 715/700 |
| 6,028,604 A * | 2/2000 | Matthews et al. ............. 715/821 |
| 6,189,018 B1 | 2/2001 | Newman et al. |
| 7,058,902 B2 | 6/2006 | Iwema et al. |
| 7,124,360 B1 * | 10/2006 | Drenttel et al. ............... 715/205 |

(Continued)

FOREIGN PATENT DOCUMENTS

WO          0197091 A2    12/2001

OTHER PUBLICATIONS

Bartram, et al., "The Intelligent Zoom as Metaphor and Navigation Tool in a Multi-Screen Interface for Network Control Systems", Date: Oct. 22-25, 1995, pp. 3122-3127, vol. 4. IEEE.

(Continued)

*Primary Examiner* — Jordany Nunez
(74) *Attorney, Agent, or Firm* — Micah Goldsmith; Glen Johnson; Micky Minhas

(57) ABSTRACT

Nested user interfaces for multiple displays is described. In embodiment(s), user interface panels can be generated for individual display on a small screen device as well as for display together to form a nested user interface on a larger display device. Each user interface panel can be individually displayed to encompass a small display screen on the small screen device. Additionally, a television client device can render a nested user interface that includes a plurality of the user interface panels displayed together to form the nested user interface on a larger display device.

19 Claims, 6 Drawing Sheets

(56) References Cited

U.S. PATENT DOCUMENTS

| | | | |
|---|---|---|---|
| 7,272,790 B2 * | 9/2007 | Fabritius | 715/209 |
| 7,287,232 B2 * | 10/2007 | Tsuchimura et al. | 715/792 |
| 7,386,801 B1 * | 6/2008 | Horvitz et al. | 715/764 |
| 7,487,458 B2 * | 2/2009 | Jalon et al. | 715/765 |
| 7,487,467 B1 * | 2/2009 | Kawahara et al. | 715/810 |
| 7,681,144 B2 * | 3/2010 | Keereepart et al. | 715/790 |
| 8,046,706 B2 * | 10/2011 | Lee et al. | 715/765 |
| 8,506,398 B2 * | 8/2013 | Shimizu | 463/31 |
| 2003/0067489 A1 | 4/2003 | Candy Wong et al. | |
| 2004/0122789 A1 | 6/2004 | Ostertag et al. | |
| 2005/0131911 A1 * | 6/2005 | Chi et al. | 707/100 |
| 2005/0149879 A1 * | 7/2005 | Jobs et al. | 715/796 |
| 2005/0188329 A1 * | 8/2005 | Cutler et al. | 715/804 |
| 2005/0229111 A1 * | 10/2005 | Makela | 715/802 |
| 2005/0283734 A1 * | 12/2005 | Santoro et al. | 715/765 |
| 2006/0123360 A1 * | 6/2006 | Anwar et al. | 715/810 |
| 2006/0150125 A1 | 7/2006 | Gupta et al. | |
| 2006/0224951 A1 * | 10/2006 | Burke et al. | 715/513 |
| 2007/0030393 A1 | 2/2007 | Lee et al. | |
| 2007/0150839 A1 * | 6/2007 | Danninger | 715/825 |
| 2007/0245263 A1 * | 10/2007 | Hale et al. | 715/810 |
| 2008/0168377 A1 * | 7/2008 | Stallings et al. | 715/772 |
| 2009/0034931 A1 * | 2/2009 | Stone et al. | 386/52 |
| 2010/0106857 A1 * | 4/2010 | Wyler | 709/246 |

OTHER PUBLICATIONS

Perlin, et al., "Nested User Interface Components", Proceedings of the 12th annual ACM symposium on User interface Software and Technology, Date: 1999, pp. 11-18, Asheville, North Carolina, US.

\* cited by examiner

NESTED USER INTERFACES FOR MULTIPLE DISPLAYS

BACKGROUND

There is a general discontinuity in user interface design across different types of client devices, such as a television set-top box, a hand-held portable device, and the like. This can adversely affect users who may have difficulty switching between devices and the different user interfaces. For example, a user may select to receive media content at home through one type of user interface for a television set-top box, and then have to navigate a different user interface on a hand-held portable device to select and receive the same media content.

The general discontinuity in user interface design across different types of client devices also unnecessarily increases development efforts because the various user interface designs are largely duplicated. Typically, an interface developer or designer has to scale and position the user interface content, such as the text, graphics, and images, to display properly on different types of displays, such as on a portable, small screen device having a smaller integrated display and/or for display on larger television display devices.

SUMMARY

This summary is provided to introduce simplified concepts of nested user interfaces for multiple displays. The simplified concepts are further described below in the Detailed Description. This summary is not intended to identify essential features of the claimed subject matter, nor is it intended for use in determining the scope of the claimed subject matter.

In embodiment(s) of nested user interfaces for multiple displays, user interface panels can be generated for individual display on a small screen device as well as for display together to form a nested user interface on a larger display device. Each user interface panel can be individually displayed to encompass a small display screen on the small screen device. For example, the user interface panels can be displayed one at a time on the small display screen as a cascading menu of media content menu choices where one user interface panel replaces another as user-selectable inputs are received.

In other embodiment(s) of nested user interfaces for multiple displays, a television client device can render a nested user interface that includes a plurality of the user interface panels displayed together to form the nested user interface on a larger display device. When a selectable input is received via a first user interface panel of the nested user interface, the display can transition from the first user interface panel to a second user interface panel on the nested user interface. Optionally, the display of a user interface panel can be modified when transitioning to another user interface panel. For instance, a user interface panel can be displayed as a background of the nested user interface or as a section of the background of the nested user interface. Alternatively, or in addition, the display of a user interface panel can be faded, repositioned, and/or otherwise altered in appearance.

BRIEF DESCRIPTION OF THE DRAWINGS

Embodiments of nested user interfaces for multiple displays are described with reference to the following drawings. The same numbers are used throughout the drawings to reference like features and components.

DETAILED DESCRIPTION

Embodiments of nested user interfaces for multiple displays provide user interface panels that can be developed with the same base layer functionality such that they will display individually on a small screen device, and will display together to form a nested user interface on a larger display device. This provides a common user experience and a seamless transition, such as when a user switches between client devices. On a small display screen of a portable, small screen device, each user interface panel can be individually displayed to encompass the small display screen. For example, the user interface panels can be displayed one at a time as a cascading menu of media content menu choices where one user interface panel replaces another as user-selectable inputs are received. On a larger display, such as for a television client device, the user interface panels can be displayed together to form a nested user interface.

While features and concepts of the described systems and methods for nested user interfaces for multiple displays can be implemented in any number of different environments, systems, and/or various configurations, embodiments of nested user interfaces for multiple displays are described in the context of the following example systems and environments.

Figure 1:
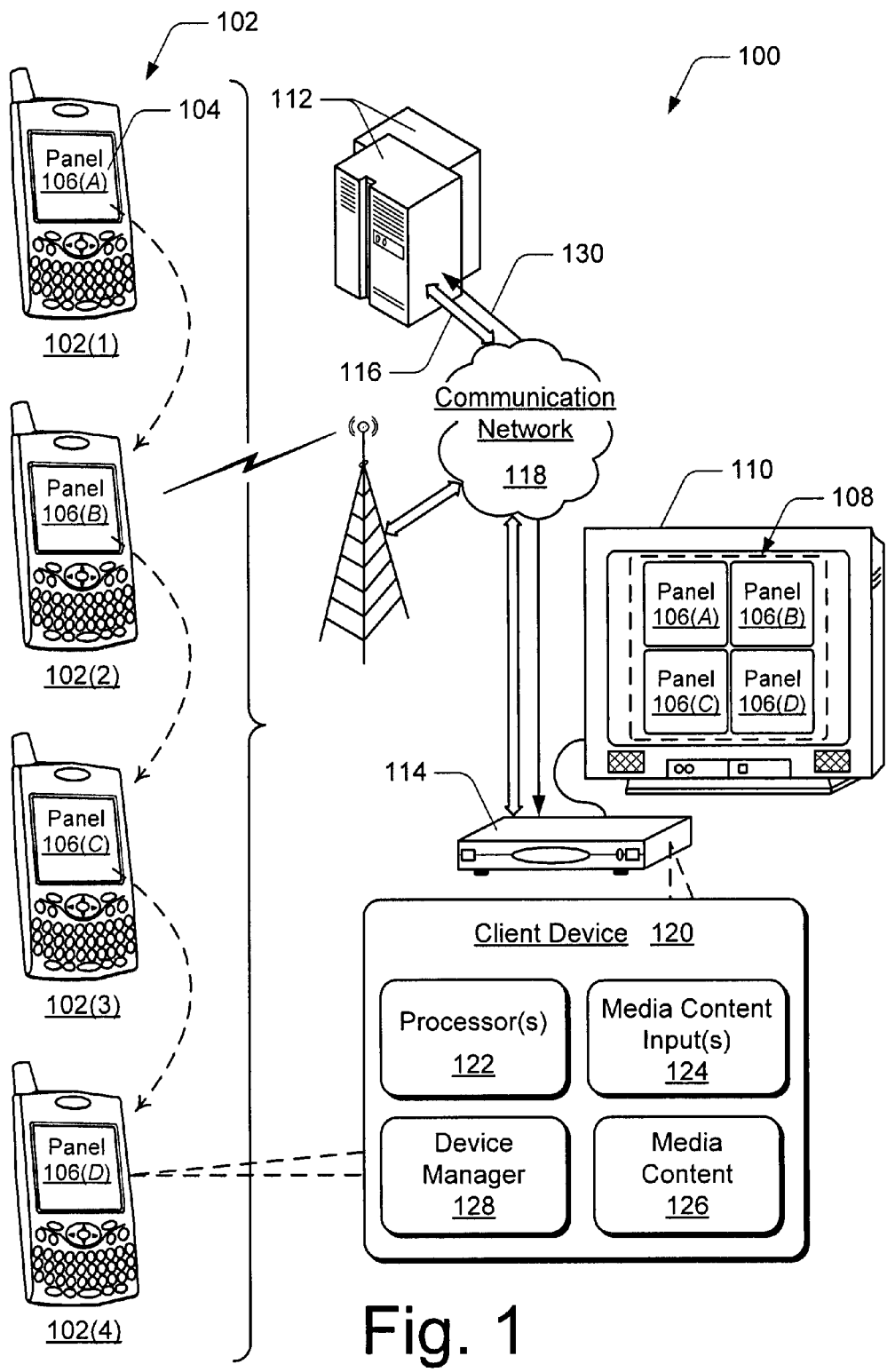
FIG. 1 illustrates an example system in which embodiments of nested user interfaces for multiple displays can be implemented.

FIG. 1 illustrates an example system 100 in which various embodiments of nested user interfaces for multiple displays can be implemented. In this example, system 100 includes a small screen device 102, such as any type or combination of a portable computing device, cell phone device, appliance device, other portable communication device, and the like that has a small display screen 104. Several instances of the same small screen device 102(1-4) are shown to illustrate an example of a cascading menu that can include several user interface panels 106(A-D). The user interface panels 106(A-D) may also be referred to as "layers" or "pages" of a user interface or cascading menu.

For example, a user may select a media content menu option on one user interface panel 106(A) that transitions to a next user interface panel 106(B) shown on the same device 102. For instance, a user may select a menu option of "Sports" on a user interface panel 106(A) and transition to select a menu option of "Football" on user interface panel 106(B). The user may then select a particular football game from menu options on user interface panel 106(C) that list team matchups and then transition to user interface panel 106(D) to watch the selected football game.

In an embodiment, any combination of the various user interface panels 106(A-D) can be combined or otherwise rendered and displayed together to form a nested user interface 108 on a larger display device 110. Reference is made throughout to a small screen device having a small display screen, and to a larger display device, or simply display device. It is contemplated that the terms "small" and "larger" are relative simply to illustrate that several user interface panels can be combined and displayed together to form a nested user interface thereby taking advantage of the increased display space that a larger display device offers. In an embodiment, several of the user interface panels 106(A-D) may be combined for display on a "small" display screen 104 of a small screen device 102.

Although only four user interface panels 106(A-D) are described with reference to the example system 100, a cascading menu may include any number and combination of user interface panels. In the nested user interface 108, the user interface panels 106(A-D) can still build upon each other when selected in a cascading menu fashion. However, a selected user interface panel 106 can remain visible and is not replaced on the display 110 such as when transitioning the user interface panels 106(A-D) on the small screen device 102. Maintaining the display of a selected user interface panel 106 in the nested user interface 108 provides more of a context for the user when selecting menu options that transition to a next user interface panel.

In this example, the nested user interface 108 includes an arrangement of the user interface panels 106(A-D) such that they are combined to form the one nested user interface 108. The depiction of the nested user interface 108 is merely exemplary to show that each user interface panel 106(A-D) is included. In practice, the boundaries (e.g., lines or distinctive edges) of the user interface panels 106(A-D) may not appear in a display when the user interface panels 106(A-D) are combined to form the nested user interface 108.

The example system 100 also includes content distributor(s) 112 that can generate and then distribute the user interface panels 106(A-D) to any number of client devices, such as the small screen device 102 and/or a television client device 114. The user interface panels 106(A-D) can be developed with the same base layer functionality such that they will display individually on the small screen device 102, and will display together to form the nested user interface 108 on the display device 110. This provides a common user experience and a seamless transition, such as when a user switches between client devices to request the same media content.

A content distributor 112 can communicate the user interface panels 106(A-D), as well as other media content, to any number of the television client devices as an IPTV multicast via an IP-based network 116 and/or a communication network 118. As described throughout, "media content" can include television programs (or programming) which may be any form of programs, commercials, music, movies, and video-on-demand media content. Other media content can include interactive games, network-based applications, and any other audio, video, and/or image content (e.g., to include a user interface panels 106(A-D)).

The IP-based network 116 can be implemented as part of the communication network 118 that facilitates media content distribution and data communication between the content distributor(s) 112 and any number of client devices, such as television client device 114. The communication network 118 can be implemented as part of a media content distribution system using any type of network topology and/or communication protocol, and can be represented or otherwise implemented as a combination of two or more networks.

In this example system 100, the television client device 114 and the display device 110 together are just one example of a television client system that renders audio, video, and/or image data. The display device 110 can be implemented as any type of television, LCD, or similar display system. An example client device 120 can be implemented as any of the client devices described herein, such as the small screen device 102 and/or the television client device 114.

The example client device 120 can be implemented as any one or combination of a television set-top box, a digital video recorder (DVR) and playback system, an appliance device, a gaming console, a portable communication device, a portable computing device, and/or as any other type of television client device or computing-based device that may be implemented in a television entertainment and information system. Additionally, client device 120 can be implemented with any number and combination of differing components as further described with reference to the example device shown in FIG. 5. Client device 120 may also be associated with a user or viewer (i.e., a person) and/or an entity that operates the device such that a client device describes logical clients that include users, software, and/or devices.

In the example system 100, client device 120 includes one or more processors 122 (e.g., any of microprocessors, controllers, and the like), media content inputs 124, and media content 126 (e.g., received media content or media content that is being received). The media content inputs 124 can include any type of communication interfaces and/or data inputs, such as Internet Protocol (IP) inputs over which streams of television media content (e.g., IPTV media content) are received via the IP-based network 116 and/or the communication network 118.

The client device 120 is configured for communication with the content distributor(s) 112 via the IP-based and communication networks. A media content input 124 can receive media content 126 as an IPTV multicast from a content distributor 112. In addition, the media content inputs 124 can include any type of wireless, broadcast, and/or over-the-air inputs via which media content is received.

Client device 120 also includes a device manager 128 (e.g., a control application, software application, etc.) that can be implemented as computer-executable instructions and executed by the processor(s) 122 to implement embodiments of nested user interfaces for multiple displays. In an embodiment, the device manager 128 can be implemented to initiate rendering the nested user interface 108 that includes any combination of the user interface panels 106(A-D) which are displayed together to form the nested user interface on display device 110.

The device manager 128 can also be implemented to monitor and/or receive selectable inputs (e.g., user selections) via menu selections on the user interface panels 106(A-D). The device manager 128 can then initiate a transition from a first user interface panel to a second user interface panel on the nested user interface 108 in response to receiving a selectable input. For example, a user may select a menu option on user interface panel 106(A) and a focus of the user interface transitions to menu options on user interface panel 106(B).

The device manager 128 can also be implemented to initiate modifying the display of a user interface panel 106 on the nested user interface 108 when the focus transitions to another user interface panel. For example, the display of a user interface panel 106 can be modified such that the user interface panel is displayed as a background of the nested user interface, or optionally as a section of the background of the nested user interface. Alternatively, or in addition, the display of a user interface panel 106 can be modified such that the user interface panel is faded, repositioned, and/or otherwise altered in appearance.

In an embodiment, the client device 120 does not generate a modified user interface panel for display in the nested user interface 108. Rather, a content distributor 112 can be implemented to facilitate the processing to generate a user interface panel 106 for display. A content distributor 112 can receive a request from the client device 120 for an updated user interface panel 106. The device manager 128 can initiate and manage the request for the updated user interface panel 106 which can be communicated via a two-way data communication link 130 of the communication network 118. It is contemplated that any one or more of the arrowed communication links 116 and 130, along with communication network 118, facilitate two-way data communication from a client device 102, 114, and/or 120 to a content distributor 112 and vice-versa.

Figure 2:
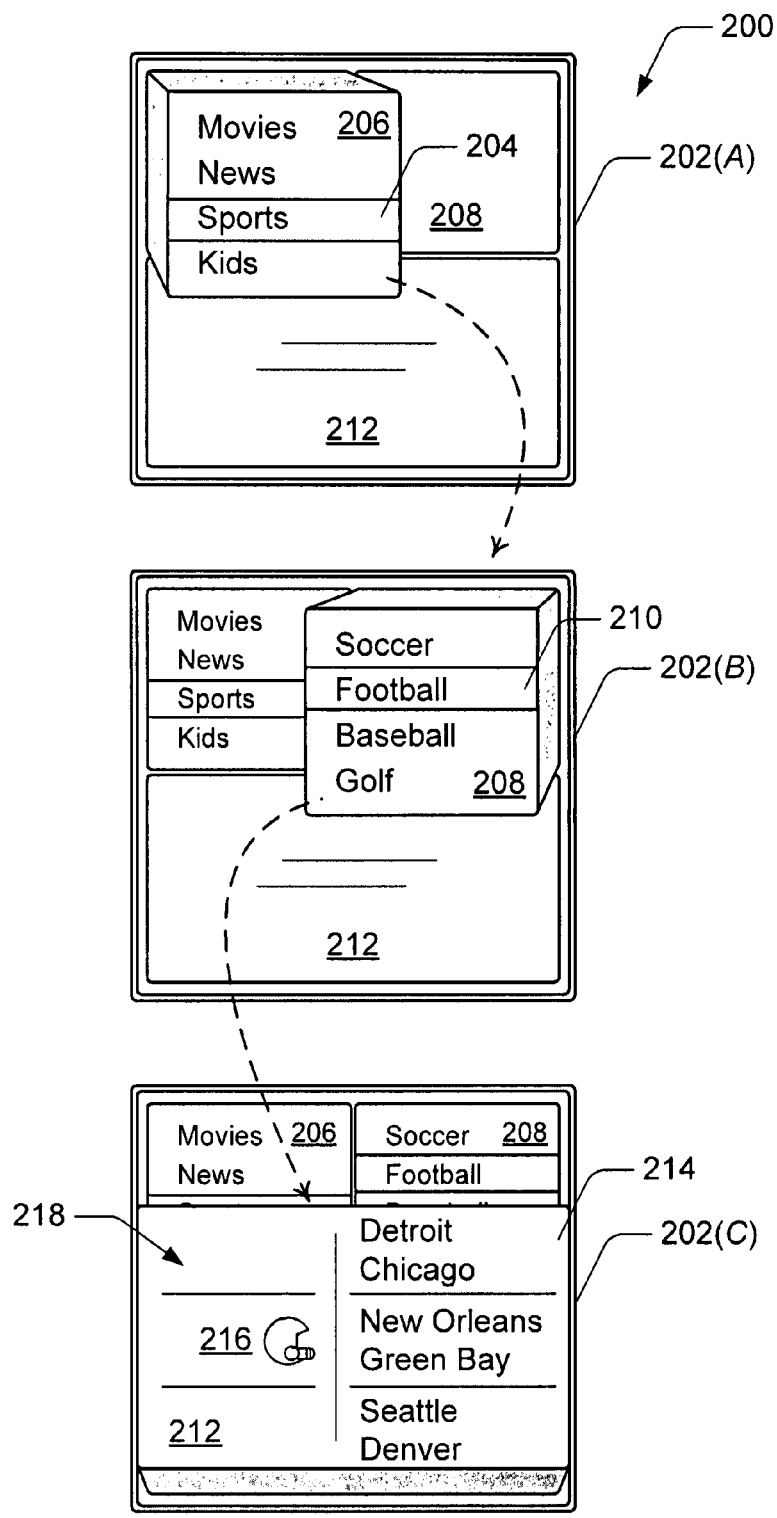
FIG. 2 illustrates various instances of a nested user interface that includes user interface panels displayed together to form the nested user interface.

FIG. 2 illustrates various instances 200 of a nested user interface 202(A-C) that includes user interface panels displayed together to form the nested user interface 202. In this example, the nested user interface 202 includes three user interface panels that form a cascading menu of media content menu choices, and illustrates transitioning from one user interface panel to a next.

For example, a user may select a menu option 204 of "Sports" on a user interface panel 206 and a focus of the nested user interface 202(A) transitions to user interface panel 208 shown on nested user interface 202(B). The user may then select the menu option 210 of "Football" on user interface panel 208 and the focus of the nested user interface 202(B) transitions to user interface panel 212 shown on nested user interface 202(C). The user may then select a particular football game from menu options 214 on user interface panel 212 that lists team matchups. In this example, the user interface panel 212 may also include a logo 216, image, and/or any other type of background 218 that may be associated with a particular menu option selection.

Each of the user interface panels can be modified for display in the nested user interface 202 when transitioning from one user interface panel to a next. For example, a user interface panel can be modified to display as a background of the nested user interface 202, or optionally as a section of the background of the nested user interface 202. Alternatively, or in addition, the display of a user interface panel can be modified such that the user interface panel is faded, repositioned, and/or otherwise altered in appearance.

Generally, any of the functions, methods, procedures, and modules described herein can be implemented using hardware, software, firmware (e.g., fixed logic circuitry), manual processing, or any combination thereof. A software implementation of a function, method, procedure, or module represents program code that performs specified tasks when executed on a computing-based processor. Example methods 300 and 400 described with reference to respective FIGS. 3 and 4 may be described in the general context of computer-executable instructions. Generally, computer-executable instructions can include applications, routines, programs, objects, components, data structures, procedures, modules, functions, and the like that perform particular functions or implement abstract data types.

The method(s) may also be practiced in a distributed computing environment where functions are performed by remote processing devices that are linked through a communications network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
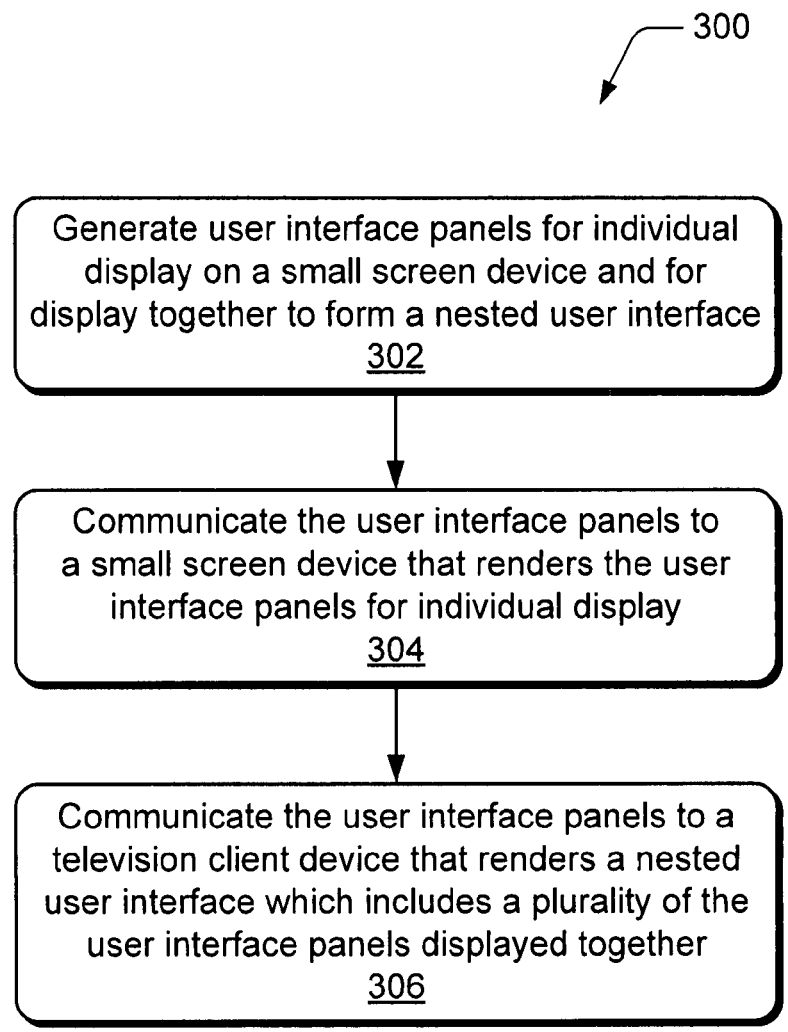
FIG. 3 illustrates example method(s) of nested user interfaces for multiple displays in accordance with one or more embodiments.

FIG. 3 illustrates example method(s) 300 of nested user interfaces for multiple displays, and is described with reference to a content distributor. The order in which the method is described is not intended to be construed as a limitation, and any number of the described method blocks can be combined in any order to implement the method, or an alternate method.

At block 302, user interface panels are generated for individual display on a small screen device, and for display together to form a nested user interface. For example, a content distributor 112 (FIG. 1) generates the user interface panels 106(A-D) for display on a client device.

At block 304, the user interface panels are communicated to a small screen device that renders the user interface panels for individual display. For example, the content distributor 112 communicates or otherwise distributes the user interface panels 106(A-D) to the small screen device 102 that renders the user interface panels 106(A-D) for individual display as panels of a cascading menu. For instance, a user may select a menu option on user interface panel 106(A) that is then replaced on the small display screen 104 by the next user interface panel 106(B).

At block 306, the user interface panels are communicated to a television client device that renders a nested user interface which includes a plurality of the user interface panels displayed together. For example, the content distributor 112 communicates or otherwise distributes the user interface panels 106(A-D) to the television client device 114 that renders the nested user interface 108 which includes the user interface panels 106(A-D) displayed together to form the nested user interface 108.

Figure 4:
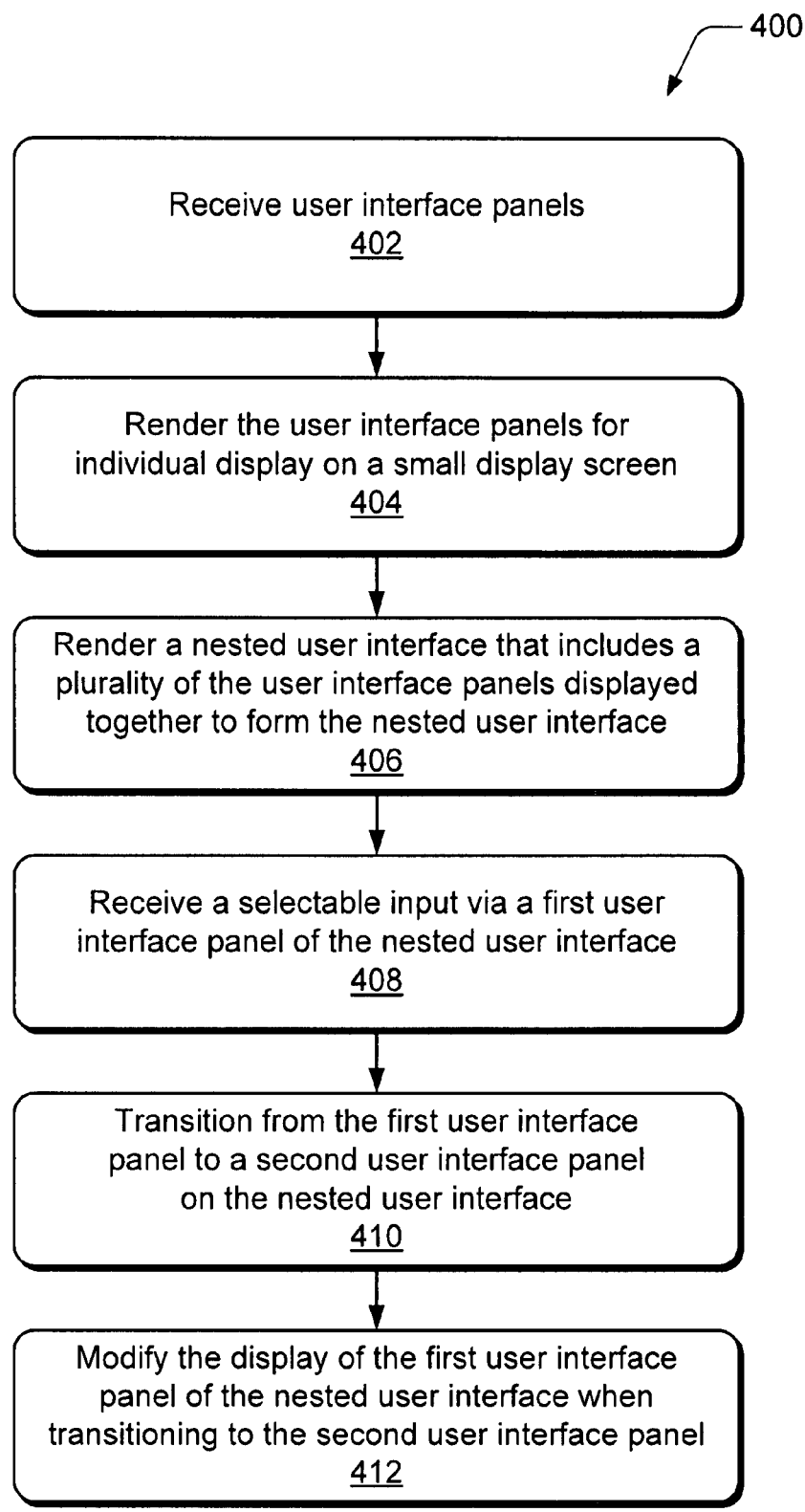
FIG. 4 illustrates example method(s) of nested user interfaces for multiple displays in accordance with one or more embodiments.

FIG. 4 illustrates example method(s) 400 of nested user interfaces for multiple displays, and is described with reference to a client device. The order in which the method is described is not intended to be construed as a limitation, and any number of the described method blocks can be combined in any order to implement the method, or an alternate method.

At block 402, user interface panels are received. For example, the television client device 114 (FIG. 1) receives user interface panels 106(A-D) from a content distributor 112 via the IP-based network 116 and/or communication network 118. Alternatively, or in addition, the small screen device 102 receives user interface panels 106(A-D) from the content distributor 112.

At block 404, the user interface panels are rendered for individual display on a small display screen. For example, the small screen device 102 renders the user interface panels 106(A-D) for individual display as panels of a cascading menu, such as for a user to select various media content menu options. Each of the user interface panels 106(A-D) encompass the small display screen 104 when displayed as a cascading transition.

At block 406, a nested user interface is rendered that includes a plurality of the user interface panels displayed together to form the nested user interface. For example, the television client device 114 renders the nested user interface 108 which includes the user interface panels 106(A-D) displayed together to form the nested user interface 108. The user interface panels 106(A-D) are displayed together as a cascading menu of media content menu choices.

At block 408, a selectable input is received via a first user interface panel of the nested user interface. At block 410, a focus of the user interface is transitioned to a second user interface panel on the nested user interface in response to receiving the selectable input. For example, a user may select a menu option 204 (FIG. 2) of "Sports" on user interface panel 206 and a focus of the nested user interface 202(A) transitions to user interface panel 208 shown on nested user interface 202(B). The user may then select the menu option 210 of "Football" on user interface panel 208 and the focus of the nested user interface 202(B) transitions to user interface panel 212 shown on nested user interface 202(C). The user may then select a particular football game from menu options 214 on user interface panel 212 that lists team matchups and transition to a display to watch the selected football game.

At block 412, the display of the first user interface panel of the nested user interface is modified when transitioning to the second user interface panel. For example, the display of a user interface panel can be modified such that the user interface panel is displayed as a background of the nested user interface, or optionally as a section of the background of the nested user interface. Alternatively, or in addition, the display of a user interface panel can be modified such that the user interface panel is faded, repositioned, and/or otherwise altered in appearance.

Figure 5:
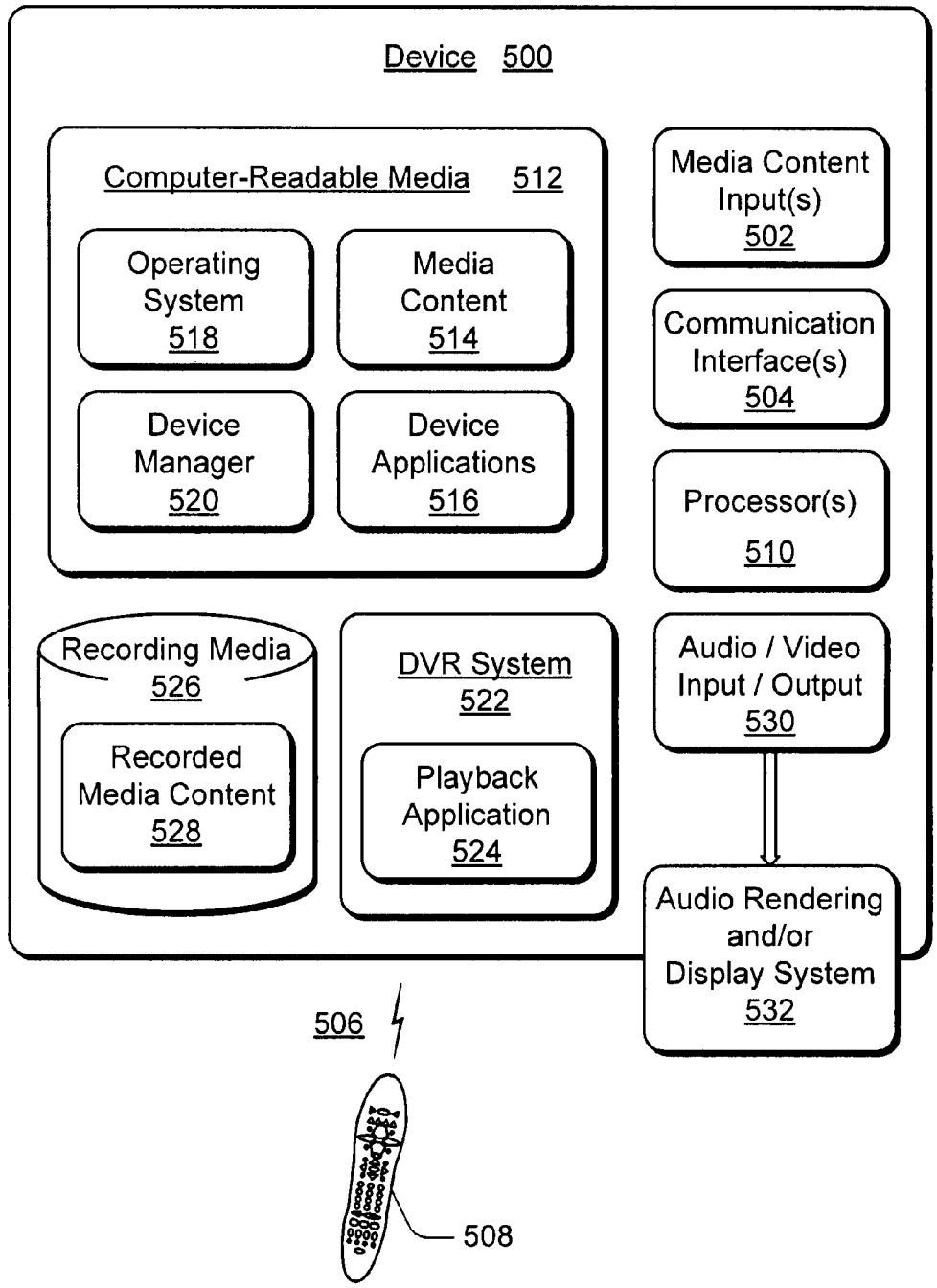
FIG. 5 illustrates various components of an example device which can implement embodiments of nested user interfaces for multiple displays.

FIG. 5 illustrates various components of an example device 500 that can be implemented as any form of a computing, electronic, appliance, television client device, or television system device to implement various embodiments of nested user interfaces for multiple displays. For example, device 500 can be implemented as a portable client device, as a television client device, or as a content distributor as shown in FIG. 1. In various embodiments, device 500 can be implemented as any one or combination of a television client device, a digital video recorder (DVR), a gaming system or console, a computing-based device, an appliance device, and/or as any other type of similar device.

Device 500 includes one or more media content inputs 502 that may include Internet Protocol (IP) inputs over which streams of media content are received via an IP-based network. Device 500 further includes communication interface(s) 504 that can be implemented as any one or more of a serial and/or parallel interface, a wireless interface, any type of network interface, a modem, and as any other type of communication interface. A network interface provides a connection between device 500 and a communication network by which other electronic and computing devices can communicate data with device 500.

Similarly, a serial and/or parallel interface provides for data communication directly between device 500 and the other electronic or computing devices. A modem also facilitates communication with other electronic and computing devices via a conventional telephone line, a DSL connection, cable, and/or other type of connection. A wireless interface enables device 500 to receive control input commands 506 and other data from an input device, such as from remote control device 508, a portable computing-based device (such as a cellular phone), or from another infrared (IR), 802.11, Bluetooth, or similar RF input device.

Device 500 also includes one or more processors 510 (e.g., any of microprocessors, controllers, and the like) which process various computer-executable instructions to control the operation of device 500, to communicate with other electronic and computing devices, and to implement embodiments of nested user interfaces for multiple displays. Device 500 can be implemented with computer-readable media 512, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like.

Computer-readable media 512 provides data storage mechanisms to store media content 514, as well as device applications 516 and any other types of information and/or data related to operational aspects of device 500. For example, an operating system 518 can be maintained as a computer application with the computer-readable media 512 and executed on processor(s) 510 to implement embodiments of nested user interfaces for multiple plays.

The computer applications can include a device manager 520 when device 500 is implemented as a content distributor, a portable device, and/or a television client device. The device manager 520 is shown as a software module in this example to implement various embodiments of nested user interfaces for multiple displays as described herein. An example of the device manager 520 is described with reference to device manager 128 for client device 120 as shown in FIG. 1.

When implemented as a television client device, the device 500 can also include a DVR system 522 with playback application 524, and recording media 526 to maintain recorded media content 528 that device 500 receives and/or records. The recorded media content 528 can include the media content 514 that is received from a content distributor and recorded. For example, the media content 528 can be recorded when received as a viewer-scheduled recording, or when the recording media 526 is implemented as a pause buffer that records the media content 528 as it is being received and rendered for viewing.

Further, device 500 may access or receive additional recorded media content that is maintained with a remote data store (not shown). Device 500 may also receive media content from a video-on-demand server, or media content that is maintained at a broadcast center or content distributor that distributes the media content to subscriber sites and client devices. The playback application 524 can be implemented as a media control application to control the playback of media content 514, the recorded media content 528, and/or any other audio, video, and/or image media content which can be rendered and/or displayed for viewing.

Device 500 also includes an audio and/or video output 530 that provides audio and/or video data to an audio rendering and/or display system 532. The audio rendering and/or display system 532 can include any devices that process, display, and/or otherwise render audio, video, and image data. Video signals and audio signals can be communicated from device 500 to a display device via an RF (radio frequency) link, S-video link, composite video link, component video link, DVI (digital video interface), analog audio connection, or other similar communication link. Alternatively, the audio rendering and/or display system 532 can be implemented as integrated components of the example device 500.

Figure 6:
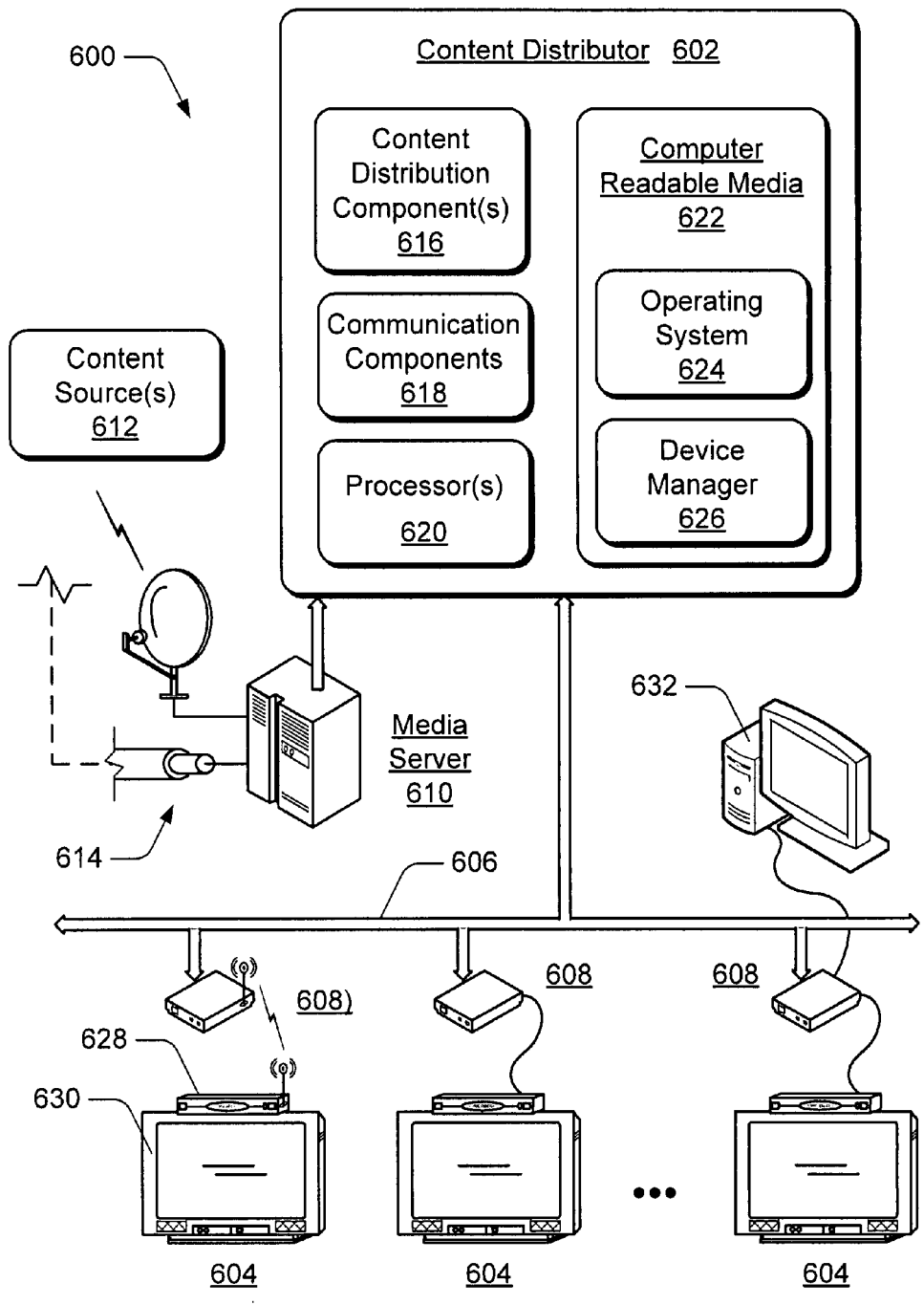
FIG. 6 illustrates various devices and components in an example entertainment and information system in which embodiments of nested user interfaces for multiple displays can be implemented.

FIG. 6 illustrates an example entertainment and information system 600 in which embodiments of nested user interfaces for multiple displays can be implemented. System 600 facilitates the distribution of media content, program guide data, and/or advertising content to multiple viewers and viewing systems. System 600 includes a content distributor 602 and any number of client systems 604 each configured for communication via a communication network 606. Each of the client systems 604 can receive data streams of media content, program content, program guide data, advertising content, closed captions data, and the like from content server(s) of the content distributor 602 via the communication network 606.

The communication network 606 can be implemented as any one or combination of a wide area network (e.g., the Internet), a local area network (LAN), an intranet, an IP-based network, a broadcast network, a wireless network, a Digital Subscriber Line (DSL) network infrastructure, a point-to-point coupling infrastructure, or as any other media content distribution network. Additionally, communication network 606 can be implemented using any type of network topology and any network communication protocol, and can be represented or otherwise implemented as a combination of two or more networks. A digital network can include various hardwired and/or wireless links 608, such as routers, gateways, and so on to facilitate communication between content distributor 602 and the client systems 604.

System 600 includes a media server 610 that receives content from various content sources 612, such as media content from a content provider, program guide data from a program guide source, and advertising content from an advertisement provider. In an embodiment, the media server 610 represents an acquisition server that receives audio and video content from a provider, an EPG server that receives the program guide data from a program guide source, and/or an advertising management server that receives the advertising content from an advertisement provider.

The content sources, such as the content provider, program guide source, and the advertisement provider control distribution of the media content, the program guide data, and the advertising content to the media server 610 and/or to other servers of system 600. The media content, program guide data, and advertising content can be distributed via various transmission media 614, such as satellite transmission, radio frequency transmission, cable transmission, and/or via any number of other wired or wireless transmission media. In this example, media server 610 is shown as an independent component of system 600 that communicates the program content, program guide data, and advertising content to content distributor 602. In an alternate implementation, media server 610 can be implemented as a component of content distributor 602.

Content distributor 602 is representative of a headend service in a content distribution system, for example, that provides the media content, program guide data, and advertising content to multiple subscribers (e.g., the client systems 604). The content distributor 602 can be implemented as a satellite operator, a network television operator, a cable operator, and the like to control distribution of media content, program and advertising content, such as movies, television programs, commercials, music, and any other audio, video, and/or image content to the client systems 604.

Content distributor 602 includes various content distribution components 616 to facilitate media content processing and distribution, such as a subscriber manager, a device monitor, and one or more content servers. The subscriber manager manages subscriber data, and the device monitor monitors the client systems 604 (e.g., and the subscribers), and maintains monitored client state information.

Although the various managers, servers, and monitors of content distributor 602 (to include the media server 610 in one embodiment) are described as distributed, independent components of content distributor 602, any one or more of the managers, servers, and monitors can be implemented together as a multi-functional component of content distributor 602. Additionally, any one or more of the managers, servers, and monitors described with reference to system 600 can implement features and embodiments of nested user interfaces for multiple displays.

The content distributor 602 includes communication components 618 that can be implemented to facilitate media content distribution to the client systems 604 via the communication network 606. The content distributor 602 also includes one or more processors 620 (e.g., any of microprocessors, controllers, and the like) which process various computer-executable instructions to control the operation of content distributor 602. The content distributor 602 can be implemented with computer-readable media 622 which provides data storage to maintain software applications such as an operating system 624 and a device manager 626. The device manager 626 can implement one or more embodiments of nested user interfaces for multiple displays. For example, the device manager 626 can initiate the generation of user interface panels, and control the distribution of the user interface panels to various client devices.

The client systems 604 can each be implemented to include a client device 628 and a display device 630 (e.g., a television, LCD, and the like). A client device 628 of a respective client system 604 can be implemented in any number of embodiments, such as a set-top box, a digital video recorder (DVR) and playback system, an appliance device, a gaming system, and as any other type of client device that may be implemented in an entertainment and information system. In an alternate embodiment, a client system 604 may implemented with a computing device 632 as well as a client device. Additionally, any of the client devices 628 of a client system 604 can implement features and embodiments of nested user interfaces for multiple displays as described herein.

Although embodiments of nested user interfaces for multiple displays have been described in language specific to features and/or methods, it is to be understood that the subject of the appended claims is not necessarily limited to the specific features or methods described. Rather, the specific features and methods are disclosed as example implementations of nested user interfaces for multiple displays.

The invention claimed is:

1. A method, comprising:
   receiving user interface panels each configured for individual display on a small screen device, each user interface panel representing a page of a user interface and encompassing a small display screen when displayed;
   displaying a nested user interface that includes a plurality of the user interface panels, including at least a first user interface panel and a second user interface panel, displayed together to form the nested user interface on a display device, the plurality of the user interface panels displayed proximate one another for display as a cascading menu of media content menu choices, the plurality of the user interface panels of the nested user interface displayed together on a television client device;
   responsive to a user selection of a media content menu choice in the first user interface panel, transitioning a focus of the nested user interface from the first user interface panel to the second user interface panel by at least repositioning both the first user interface panel and the second user interface panel; and
   displaying the user interface panels individually and sequentially on the small screen device.

2. A method as recited in claim 1, wherein the user interface panels are configured for display one at a time on the small display screen as the cascading menu of media content menu choices.

3. A method as recited in claim 1, further comprising:
   receiving a selectable input via the first user interface panel of the nested user interface; and transitioning from the first user interface panel to the second user interface panel on the nested user interface in response to receiving the selectable input.

4. A method as recited in claim 3, further comprising modifying the display of the first user interface panel of the nested user interface when transitioning the focus to the second user interface panel.

5. A method as recited in claim 4, wherein modifying the display of the first user interface panel includes displaying the first user interface panel as a background of the nested user interface.

6. A method as recited in claim 4, wherein modifying the display of the first user interface panel includes fading the display of the first user interface.

7. A method as recited in claim 1, further comprising communicating the at least first and second user interface panels to the television client device that displays the nested user interface.

8. A nested user interface system, comprising:
at least a processor and a memory having instructions executable by the processor to implement:
a user interface panel configured for display on a small display screen, the user interface panel representing a page of a user interface and encompassing the small display screen when displayed;
at least an additional user interface panel configured for display on the small display screen that replaces the user interface panel when displayed on the small display screen, the user interface panel and the at least additional user interface panel configured for sequential, individual display on the small display screen; and
a nested user interface that includes the user interface panel and the at least additional user interface panel, the user interface panels configured for display together on a display device to form the nested user interface, the user interface panels nested as a cascading menu of media content menu choices, the user interface panel and the additional user interface panel both being repositioned when transitioning from the user interface panel to the additional user interface panel responsive to a user selection of a media content menu choice in the user interface panel, and the user interface panels of the nested user interface displayed together on a television client device.

9. A nested user interface system as recited in claim 8, wherein the nested user interface includes the user interface panels displayed together on the television client device as the cascading menu of media content menu choices.

10. A nested user interface system as recited in claim 9, wherein a content provider generates and communicates the user interface panels to the television client device.

11. A nested user interface system as recited in claim 8, wherein the small display screen is integrated with a portable device that is configured to display the user interface panels one at a time on the small display screen.

12. A nested user interface system as recited in claim 8, wherein a display of the user interface panel in the nested user interface is modified when transitioning from the user interface panel to the additional user interface panel.

13. A nested user interface system as recited in claim 12, wherein the user interface panel is modified such that the user interface panel is displayed as a section of the background of the nested user interface.

14. A method comprising:
receiving a user interface panel configured for display on a small display screen and a large display screen, the user interface panel representing a page of a user interface;
receiving one or more subsequent user interface panels, wherein a subsequent user interface panel replaces a previous user interface panel displayed on the small display screen and wherein the subsequent user interface panel nests with the previous user interface panel to display as a nested user interface on the large display screen;
displaying the nested user interface to include the previous user interface panel and the subsequent user interface panel displayed proximate one another as a cascading menu of media content menu choices, the previous user interface panel and the subsequent user interface panel of the nested user interface displayed together on a television client device;
transitioning from the previous user interface panel to the subsequent user interface panel in response to a selection of a menu item in the previous user interface panel, the transitioning including at least repositioning both the subsequent user interface panel and the previous user interface panel;
modifying a display of the subsequent user interface panel based on the menu item selected in the previous user interface panel; and
displaying the user interface panels individually and sequentially on the small display screen.

15. A method as recited in claim 14, wherein the nested user interface includes all of the user interface panels displayed together on the television client device.

16. A method as recited in claim 14, further comprising communicating said user interface panels from a portable device integrated with the small display screen to the television client device integrated with the large display screen.

17. A method as recited in claim 14, wherein a display of the previous user interface panel in the nested user interface is modified when said transitioning from the previous user interface panel to the subsequent user interface panel.

18. A method as recited in claim 17, wherein the previous user interface panel is modified to display as a section of a background of the nested user interface.

19. A method as recited in claim 14, further comprising modifying the display of the subsequent user interface panel to include a background associated with the menu item selected in the previous user interface panel.

* * * * *